United States Patent
Spies et al.

(10) Patent No.: US 9,476,455 B2
(45) Date of Patent: Oct. 25, 2016

(54) OUTER RING FOR A ROLLING-ELEMENT BEARING, AND METHOD FOR ASSEMBLING A ROLLING-ELEMENT BEARING

(71) Applicants: Rainer Spies, Donnersdorf (DE); Padelis Katsaros, Schweinfurt (DE)

(72) Inventors: Rainer Spies, Donnersdorf (DE); Padelis Katsaros, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 85 days.

(21) Appl. No.: 14/520,653

(22) Filed: Oct. 22, 2014

(65) Prior Publication Data
US 2015/0117807 A1     Apr. 30, 2015

(30) Foreign Application Priority Data
Oct. 24, 2013 (DE) .................. 10 2013 221 601

(51) Int. Cl.
| F16C 19/24 | (2006.01) |
| F16C 33/58 | (2006.01) |
| F16C 43/04 | (2006.01) |
| F16C 25/08 | (2006.01) |

(52) U.S. Cl.
CPC ............. *F16C 33/586* (2013.01); *F16C 25/08* (2013.01); *F16C 43/04* (2013.01); *F16C 2202/22* (2013.01); *Y10T 29/49679* (2015.01)

(58) Field of Classification Search
CPC .... F16C 19/364; F16C 19/525; F16C 33/58; F16C 33/583; F16C 33/586; F16C 43/04
USPC .................................................. 384/493, 557
See application file for complete search history.

(56) References Cited

U.S. PATENT DOCUMENTS

| 5,028,152 A | 7/1991 | Hill et al. |
| 8,591,120 B2 * | 11/2013 | Ince ......................... F16C 25/08 384/493 |
| 8,684,608 B2 * | 4/2014 | Ince ...................... F16C 19/182 384/493 |
| 8,690,445 B2 * | 4/2014 | Doerrfuss ............. F16C 19/163 384/493 |
| 2012/0106885 A1 | 5/2012 | Ince et al. |
| 2012/0106886 A1 | 5/2012 | Ince et al. |

FOREIGN PATENT DOCUMENTS

| DE | 102005043945 A1 | 3/2007 |
| DE | 102009056615 A1 | 6/2011 |
| DE | 102010009116 A1 | 8/2011 |

* cited by examiner

*Primary Examiner* — James Pilkington
(74) *Attorney, Agent, or Firm* — Bryan Peckjian; SKF USA Inc. Patent Dept.

(57) ABSTRACT

An outer ring for a rolling-element bearing includes a first region having a first diameter on an outer surface of the outer ring, a second region on the outer surface of the outer ring, the second region having a second diameter larger than the first diameter, a circumferential groove at a boundary between the first region and the second region, and a filler in the groove. The filler is configured such that a temperature compensation ring can be mounted to the outer ring at the first region so that it abuts on an axial end of the second region, the temperature compensation ring having an inner diameter, at least in the region which is disposed over the groove in the radial direction, that corresponds to the outer diameter of the first region.

14 Claims, 3 Drawing Sheets

OUTER RING FOR A ROLLING-ELEMENT BEARING, AND METHOD FOR ASSEMBLING A ROLLING-ELEMENT BEARING

CROSS-REFERENCE TO RELATED APPLICATIONS

This application claims priority to German patent application no. 10 2013 221 601.7 filed on Oct. 24, 2013, the contents of which are fully incorporated herein by reference.

TECHNOLOGICAL FIELD

Exemplary embodiments are directed to an outer ring for a rolling-element bearing and a method for assembling a rolling-element bearing, and, more specifically, to an outer ring for a rolling-element bearing that is configured to support a temperature compensation ring and a method for assembling an outer ring of a rolling-element bearing that is configured to support a temperature compensation ring.

BACKGROUND

Rolling-element bearings are used in many applications in which they are exposed to different temperature conditions. In some cases the rolling-element bearing or components thereof may behave differently than the component on which they are mounted when the local temperature changes. For example, the bearing and the component on which the bearing is mounted may have different coefficients of thermal expansion and thus expand or deform differently in response to temperature changes. This problem is encountered, for example, in rolling-element bearings that are used in an aluminum housing. It is therefore sometimes necessary to provide temperature compensation elements between a rolling-element bearing ring and the housing or element on which the rolling-element bearing is mounted.

Some conventional rolling-element bearings include a radially projecting flange on an outer ring. The flange is disposed in a first axial region on an outer surface of the outer ring and has a larger diameter than a second axial region on the outer surface of the outer ring. Some conventional outer rings may include an elastomer ring pushed onto the second axial region, which elastomer ring functions as a temperature compensation element.

The elastomer ring usually has a very high coefficient of thermal expansion. If the outer ring and the housing expand at different rates (e.g., in response to temperature changes), the elastomer ring should expand enough to prevent a gap from developing between the housing and the outer ring. The elastomer ring should thus compensate for the increase in clearance that arises between the bearing outer ring and the housing at an increased operating temperature.

For manufacturing reasons, conventional outer rings often have an undercut at a base of the flange, that is, at a boundary between the flange and the portion of the outer surface of the outer ring having the smaller diameter. The undercut may comprise a radially circulating groove that extends circumferentially around the ring.

When forces act on the elastomer temperature-compensation ring, it begins to deform and, in a sense, flow. This many cause a part of the elastomer ring to flow into the groove which is located next to the elastomer ring. The portion or volume of the temperature compensation ring that flows into the groove is thus not available for performing the clearance compensation function in the axial direction that it is intended to perform. To prevent the elastomer ring from flowing into the groove, it is conventional to place a ring or plate (which may, for example, comprise a metal ring or metal plate) on the second axial area against the flange to cover the groove. However this solution requires the use of an additional component, the ring or plate, and consequently, a separate assembly step.

SUMMARY

There is therefore a need to a improve an outer ring for a rolling-element bearing such that the bearing ring can be more easily assembled and so that it can reliably compensate for a clearance in an axial direction. This need is met by an outer ring and a method for assembling a rolling-element bearing as described hereinafter.

Exemplary embodiments relate to an outer ring for a rolling-element bearing. The outer ring comprises a first region and a second region on an outer surface of the outer ring. The second region has a larger diameter than the first region and may sometimes be referred to as a flange. The outer ring also has a radially circulating or circumferential groove at a boundary between the first region and the second region, that is, at the base of the flange. The groove is at least partially filled with a filler in a manner that allows a temperature compensation ring to be disposed at the first region such that it abuts on an axial end of the second region. The temperature compensation ring further has an inner diameter, at least in the region which is disposed over the groove in the radial direction, which corresponds to the outer diameter of the first region.

The presence of the filler in the groove better allows the temperature compensation ring to compensate for axial clearances that might occur between components in the event of a temperature change. Because the groove is filled with the filler, the material of the temperature compensation ring cannot flow into the groove. Thus the entire volume of the temperature compensation ring is available to perform its clearance compensation function. In addition, since the filler is disposed in the groove and the temperature compensation ring abuts on the axial end of the second region, the entire space between the housing and the outer ring can be used for accommodating/receiving the temperature compensation ring. That is, the temperature compensation ring can have a large-as-possible cross-section (a larger axial length than prior art temperature compensation rings), since no space is needed for the ring or plate that was conventionally needed to cover the groove. Thus the ability of the temperature compensation ring to compensate for axial clearance is improved.

In some further exemplary embodiments, the circumferential groove has a semicircular cross-section. For example, the groove may be oriented such that it is disposed symmetrically between an axial end of the second region and an outer surface of the first region.

In some further exemplary embodiments, the temperature compensation ring has a rectangular cross-section, and thus in an unloaded state the temperature compensation ring has as many as possible contact surfaces in common with the outer ring and the housing. The occurrence of cavities, into which the temperature compensation ring could flow when subjected to pressure, is thereby avoided. However, the temperature compensation ring is not limited to being rectangular and can have any cross-sectional shape, for example, without limitation, it may be oval, square, rectangular, round, etc. In some further exemplary embodiments, the temperature compensation ring is configured to provide an abutment surface that is as large as possible for abutting against surfaces of the components that surround the temperature compensation ring. For example, the temperature compensation ring can be an elastomer ring.

In some further exemplary embodiments, the temperature compensation ring abuts axially against an axially facing end of the second region. An inner diameter of the temperature compensation ring, which corresponds to the outer diameter of the first region, can deviate from a value of the outer diameter, and this allows the temperature compensation ring to be pushed onto the first region of the outer diameter under normal environmental conditions. In other words, the inner diameter of the temperature compensation ring can have a smaller clearance with respect to the outer diameter of the first region of the outer ring. Since only a filler is introduced into the groove, a manufacturability of the outer ring can be simplified. The need to provide and install a plate or ring for covering the groove is eliminated.

In some further exemplary embodiments, the outer ring may be delivered as a preassembled component that includes a temperature compensation ring disposed over the groove in the radial direction. Since the temperature compensation ring is disposed over the groove in the radial direction, in some exemplary embodiments the temperature compensation ring can be disposed on the outer ring without clearance or without much clearance. Furthermore, in some exemplary embodiments the temperature compensation ring can be pressed into the filler while the filler is still liquid or moldable, and the temperature compensation ring may thus displace and shape the filler so that the groove is filled with filler up to a diameter of the first region of the outer surface.

In some further exemplary embodiments a volume of the filler introduced into the groove corresponds to at least a volume of the groove. In this way, it can be ensured that the groove is completely filled with the filler and that no material of the temperature compensation ring can be displaced into the groove.

In some further exemplary embodiments, the volume of filler introduced into the groove is greater than a volume of the groove. Thus if a filler is used that shrinks when it dries or hardens, the filler will still fill the groove completely even after it has dried or hardened.

In some further exemplary embodiments a volume of filler smaller than the volume of the groove can be introduced into the groove. Thus in some exemplary embodiments only a small part or only a small amount of the volume of the temperature compensation ring can be pushed into the groove.

In some further exemplary embodiments the filler is configured to be at least partially displaced from the groove upon an installation of the temperature compensation ring. Pushing the temperature compensation ring partially into the groove thus forces some of the filler out of the groove, and this displaced filler may end up between the temperature compensation ring and the outer ring. Thus, even if too much filler is introduced into the groove, the temperature compensation ring can still be disposed on the outer ring such that it abuts flush on the axial end of the second region and is installed correctly. The assembly or the manufacturing of the outer ring can be simplified at least in part because the amount of filler used need not be metered precisely. A filler that has been introduced in too large an amount can be displaced or removed from the groove again in a relatively problem-free manner and the temperature compensation ring can nonetheless be correctly installed. The displacing of the filler during the pushing-on of the temperature compensation ring can, for example, be possible if the filler is still liquid or at least has not dried or hardened at the time the temperature compensation ring is installed. The filler can optionally have an elastic property after the hardening or drying. Since the filler displaced out of the groove is disposed between the outer ring and the temperature compensation ring, in some exemplary embodiments the filler can act as an adhesive between the temperature compensation ring and the outer ring. The two components could thus be fixed to each other.

In some further exemplary embodiments, the filler and the material of the temperature compensation ring have the same coefficient of thermal expansion. The filler in the groove and the temperature compensation ring may thus behave identically in response to temperature changes, and this may reduce the likelihood that there will be room in the groove for the temperature compensation ring to flow into.

In some further exemplary embodiments the filler and a material of the temperature compensation ring have the same modulus of elasticity. Under certain circumstances it can thus be made possible that if a force acts on the temperature compensation ring, the force does not displace the filler from the groove.

In some further exemplary embodiments the filler has a temperature resistance of at least 150° C. in order to withstand normal operating temperatures of the rolling-element bearing. The filler can be any type of material. For example, the filler can be a material which is introduced into the groove in a liquid state that then hardens and assumes the shape of the groove. The filler can also remain elastically deformable or it may harden completely. Furthermore, the filler may be a solid component that has the same general shape as the groove before it is inserted into the groove. For example, the filler can comprise a rubber, an elastomer, a polymer, a silicone, etc.

Some exemplary embodiments relate to a rolling-element bearing including an outer ring according to at least one of the described exemplary embodiments. In some exemplary embodiments, these rolling-element bearings can be used in a housing which expands differently in response to temperature changes than the outer ring of the rolling-element bearing itself. As a result, some exemplary embodiments of this rolling-element bearing can be used, for example, in applications in which large temperature changes occur and/or the rolling-element bearings are installed in housings which are manufactured from a different material than the rolling-element bearing itself or a material which has a significantly different temperature behavior. The rolling-element bearing may be a tapered roller bearing or any other bearing on which forces act in an axial direction.

Some exemplary embodiments relate to a method for assembling a rolling-element bearing. In such a rolling-element bearing a filler is introduced into a circumferential groove that has a radial depth. The groove lies on a boundary between a first region and a second region of an outer ring, and the second region has a larger diameter than the first. Furthermore, a temperature compensation ring having an inner diameter which corresponds to the diameter of the first ring is pushed onto the first region such that the temperature compensation ring abuts on an axial end of the second region and is disposed over the groove in the radial direction. Thus in some exemplary embodiments of the method the groove is filled with the filler, and the temperature compensation ring can no longer be displaced into the groove when subjected to a force.

In some further exemplary embodiments, the volume of the filler used is greater than the volume of the groove. Thus, in some exemplary embodiments introducing filler can be simplified since the amount need not be accurately metered. Furthermore, filler shrinkage, for example, due to hardening, drying, or solidification of the filler can also be compensated for.

In some further exemplary embodiments the temperature compensation ring is pushed onto the outer ring while the filler in the groove is still liquid. The filler thus receives a surface shape in the groove that corresponds to a radially-inward-oriented surface shape of the temperature compensation ring. This allows the temperature compensation ring to be installed in a clearance-free manner on the outer ring. In this case the still-liquid filler can optionally be formed such that it can be deformed such that it maintains a shape that it received prior to hardening.

BRIEF DESCRIPTION OF THE DRAWINGS

Further advantageous embodiments are described in more detail below with reference to exemplary embodiments depicted in the drawings, but are not limited to said exemplary embodiments.

The Figures thus schematically show the following views.

FIG. 2b is an enlarged portion of FIG. 2a.

DETAILED DESCRIPTION

Figure 1:
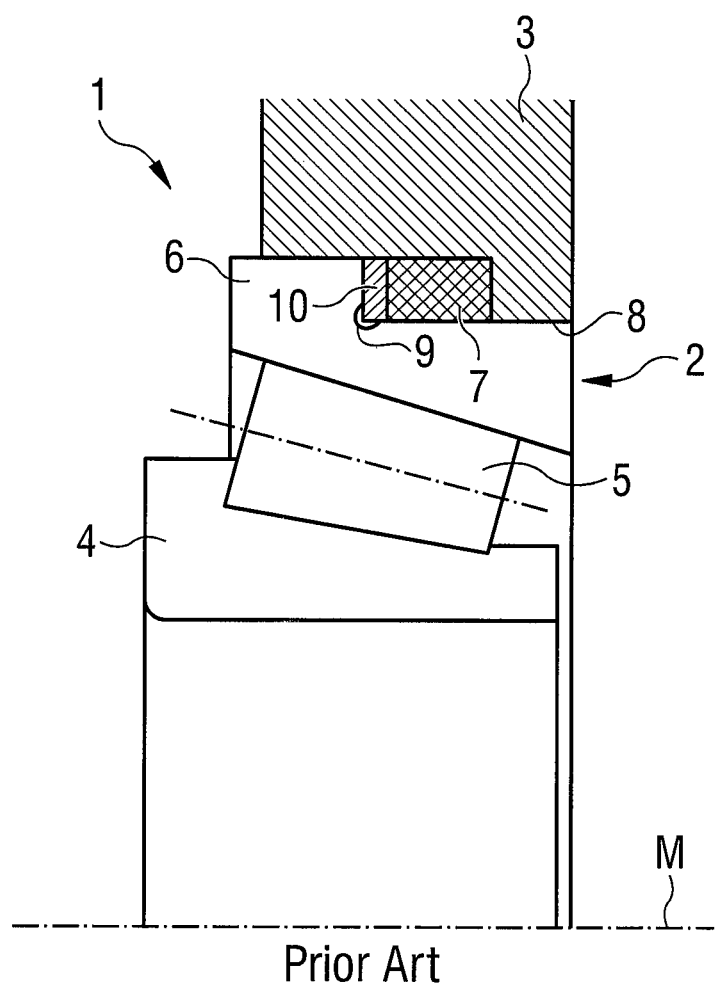
FIG. 1 is a schematic cross-sectional view of a rolling-element bearing with a conventional outer ring.

In the following description of the accompanying Figures, like reference numerals refer to like or comparable components. Furthermore, summarizing reference numerals are used for components and objects that appear multiple times in an exemplary embodiment or in an illustration but that are described together in terms of one or more common features. Components or objects that are described with the same or summarizing reference numerals can be embodied identically, but also optionally differently, in terms of individual, multiple, or all features, their dimensions, for example, as long as the description does not explicitly or implicitly indicate otherwise.

FIG. 1 is a schematic cross-sectional view of a rolling-element bearing 1 including a conventional outer ring 2 and an inner ring 4. A plurality of tapered rollers 5 are guided between the outer ring 2 and the inner ring 4. The outer ring 2 includes a flange 6 that serves for positioning the tapered roller bearing in an axial direction.

The tapered roller bearing 1 is a conventional tapered roller bearing having an elastomer ring 7 for temperature compensation axially adjacent to the flange 6. The temperature compensation ring 7 has a rectangular cross-section. Furthermore, the temperature compensation ring 7 has a very high thermal expansion coefficient. For example, the temperature compensation ring 7 can comprise or be formed from a fluoroelastomer material (FPM) or a hydrogenated nitrile butadiene rubber (HNBR) or from any other elastic material or elastomer having a suitably high thermal expansion coefficient.

The outer ring 2 is disposed in a housing 3 which may comprise, for example, an aluminum housing of a transmission. Two tapered roller bearings, of which only one is illustrated in FIG. 1, can be installed therein, for example in an X-arrangement. At some operating temperatures an increase in clearance between the outer ring 2 and the housing 3 can result due to the different coefficients of thermal expansion of the materials of the outer ring 2 and the housing 3. The temperature compensation ring 7 should compensate for these different expansion rates and prevent a clearance in the axial direction M between the outer ring 2 and the housing 3 from occurring.

A groove 9 having a smaller radius than the flange 6 is present as a recess or an undercut between the flange 6 and an outer ring surface diameter 8. The groove 9 is an artifact of the production method used to form the outer ring 2. The groove 9 is circumferential and has a radial depth. The material of the temperature compensation ring 7 can flow or behave in some ways like a fluid, and thus, if the temperature compensation ring 7 is subjected to pressure or force, part of the temperature compensation ring 7 may flow or be displaced into the groove 9. This can happen, for example, due to a temperature increase with concomitant volume expansion. Part of the axial clearance compensation which should be effected by the temperature compensation ring 7 is lost due to this "filling" of the groove 9 by a part of the temperature compensation ring 7. To prevent this, in the outer ring 2 of FIG. 1, the groove 9 is covered by a plate or ring 10, which may be formed, for example, of metal (or another material that will not flow into the groove 9 under pressure).

This conventional solution requires two components—the ring 10 and the temperature compensation ring 7, and this increases both the assembly time and the cost of materials for the tapered roller bearing 1. Furthermore, the temperature compensation ring 7 must be shortened in the axial direction by the width of the ring 10, and thus only a smaller volume of material is available for expanding and contracting in response to temperature changes. This may reduce the ability of the temperature compensation ring to compensate for axial dimensional changes. The ring 10, made, for example, of metal, is not suitable for compensating for the non-uniform deforming of outer ring 2 and housing 3.

Figure 2A:
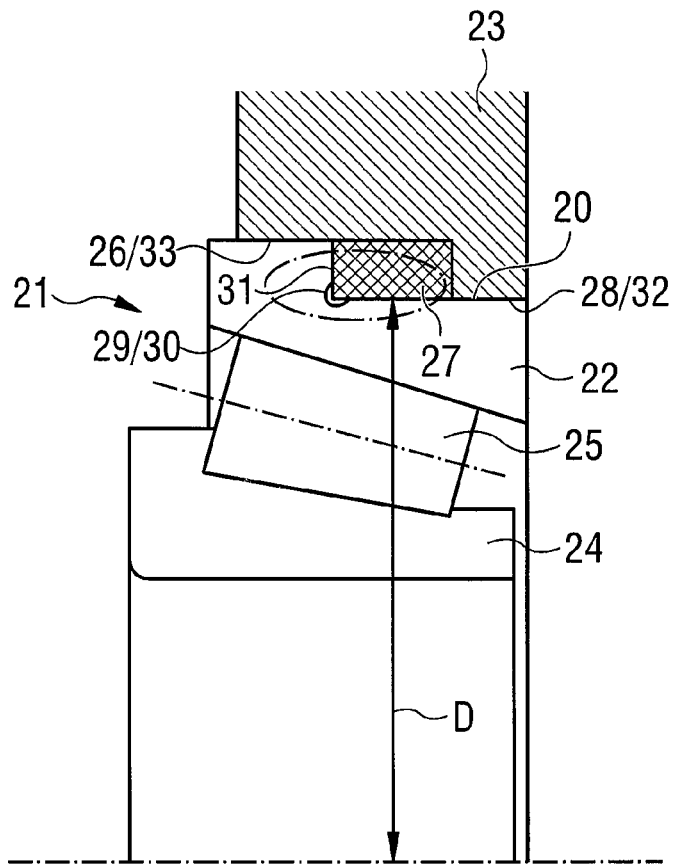
FIG. 2a is a schematic cross-sectional view of a rolling-element bearing including an outer ring according to an exemplary embodiment.
Figure 2B:
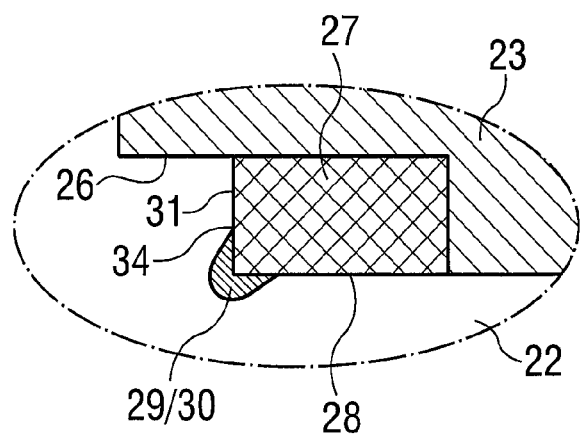

FIG. 2a shows a schematic cross-sectional depiction of a rolling-element bearing including an outer ring according to an exemplary embodiment. FIG. 2b shows a schematic cross-sectional depiction of an enlarged section according to FIG. 2a.

As is depicted in FIG. 2a, an outer ring 22 for a rolling-element bearing 21 comprises a first region 28 on an outer surface 20 of the outer ring 22. The outer ring 22 further comprises a second region 26. The second region 26 has a larger diameter than the first region 28 and may be referred to as a flange. The outer ring 22 also includes a circumferential groove 29 having a radial depth. The groove 29 is disposed at a boundary between the first region 28 and the second region 26 (at the base of the flange formed by the second region) and is filled with a filler 30. This allows a temperature compensation ring 27 to be disposed on the first region 28 such that it abuts on an axial end 31 of the second region 26. The temperature compensation ring 27 further has, at least in the region which is disposed over the groove 29 in the radial direction, an inner diameter D which corresponds to an outer diameter of the first region 28.

In the exemplary embodiment of FIGS. 2a and 2b the rolling-element bearing 21 is a tapered roller bearing disposed in a housing 23 in a substantially analogous manner to the tapered roller bearing 1 of FIG. 1. The housing 23 has a first region 32 which has an inner diameter which corresponds to an outer diameter of the first region 28. The housing 23 further has a second region 33 which has an inner diameter which corresponds to an outer diameter of the second region 26. The second region 33 has a greater extension in the axial direction than the second region 26 of the inner ring 22. The outer surface 20 is directed radially outward. In an installed state, a space is thus provided between housing 23 and inner ring 22 for receiving the temperature compensation ring 27.

The temperature compensation ring 27 has a rectangular cross section. Furthermore, the temperature compensation ring 27 has a very high thermal expansion coefficient. For example, the temperature compensation ring 27 can comprise or be formed of a fluoroelastomer (FPM) or hydrogenated nitrile butadiene rubber (HNBR) or any other elastic material or elastomer having a sufficiently high thermal expansion coefficient. The temperature compensation ring 27 has a greater extension in the axial direction than the temperature compensation ring 7 because there is no need to leave room for a conventional ring 10 for covering the groove 29. Instead, the temperature compensation ring 27 is partially disposed over the groove 29 in the radial direction.

Prior to the mounting or pushing-on of the temperature compensation ring 27, the filler 30 is injected into the groove 29. This may be done in a manner comparable to injecting a silicone seam or bead. When the temperature compensation ring 27 is pushed onto the first region 28 of the outer ring 22, excess filler 30 may flow to a location between the temperature compensation ring and a portion of the outer ring. The temperature compensation ring 27 has an axial end 34 which faces the second region 26, and the excess filler 30 may thus be pressed between an axial end 31 of the second region 26 and the axial end 34 of the temperature compensation ring 27. This may cause the elastomer ring to adhere to the axial end surface 31 of the outer ring or of the second region 26.

In the exemplary embodiment of FIGS. 2a and 2b, the amount of filler used is selected such that no excess filler material exits from a joint or the intermediate space between the axial end 31 and the temperature compensation ring 27. The filler 30 can be any material and may have a temperature resistance of up to approximately 150° C. Furthermore, in some exemplary embodiments the filler 30 may be resistant to high-additive transmission oils. Furthermore, in some exemplary embodiments the filler 30 can have a chemical compatibility with the elastomer material.

Filling the groove 29 with the filler 30 stops the elastomer material of the temperature compensation ring 27 from flowing into the groove 29. Thus, for example, the axial-clearance-compensating ability of the temperature compensation ring 27 can be fully exploited. The undercut space in the groove 29 is filled with the filler 30. The tapered roller bearing (TRB) 21 includes an elastomer ring for temperature compensation. The undercut in or on the flange is filled with a filler.

Figure 3:
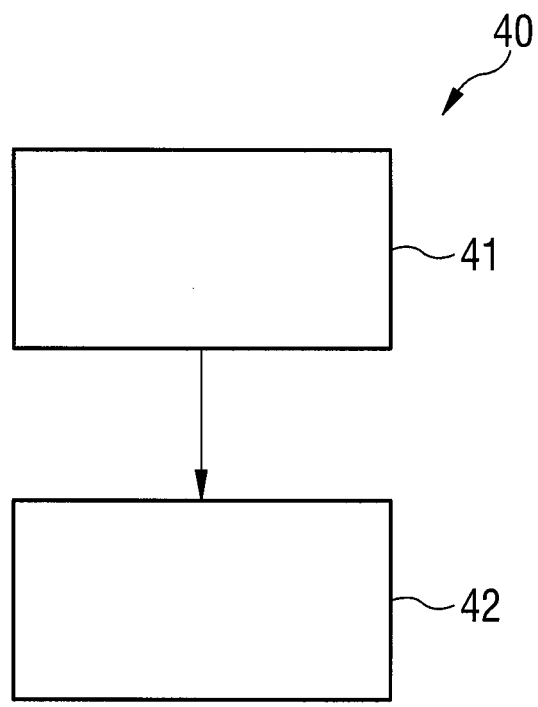
FIG. 3 is a flow chart illustrating a method for assembling a rolling-element bearing according to an exemplary embodiment.

As depicted in FIG. 3, a method 40 for assembling a rolling-element bearing comprises a plurality of operations. In a first operation 41, a filler is introduced into a circumferential groove having a radial depth which groove is disposed at a boundary between a first region and a second region. The second region has a larger diameter than the first region and may be described as a flange. In a further operation 42, a temperature compensation ring is pushed onto the outer ring. For this purpose the temperature compensation ring has an inner diameter which corresponds to a diameter of the first region. The temperature compensation ring is pushed onto the outer ring such that it abuts on an axial end of the second region and is disposed over the groove in the radial direction.

In this manner the temperature compensation ring abuts flush on the second region, i.e. on a flange of the outer ring. It could thus furthermore be prevented, or at least the risk could be reduced, that material of the temperature compensation ring is displaced into a region of the groove.

An outer ring or a rolling-element bearing according at least one of the exemplary embodiments can be used in any application, and its use is not limited to a transmission having an aluminum housing as discussed above. For example, an outer ring according to at least one of the exemplary embodiments can be used in any rolling-element bearing, such as any rolling-element bearing on which axial forces act. Furthermore, the outer rings can be used in all possible bearing applications, for example machine tools, industrial machines, vehicles, or the like.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved outer rings of roller-element bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Tapered roller bearing
2 Outer ring
3 Housing
4 Inner ring
5 Tapered roller
6 Flange
7 Temperature compensation ring
8 Outer surface
9 Groove
10 Ring
20 Outer surface
21 Tapered roller bearing
22 Outer ring
23 Housing
24 Inner ring
25 Rolling element
26 Second region
27 Temperature compensation ring 28 First region
29 Groove
30 Filler
31 Axial end
32 First region
33 Second region
34 Axial end
40 Method
41 Introducing
42 Pushing-on
M Axial direction
D Diameter

We claim:

1. An outer ring for a rolling-element bearing comprising:
a first region having a first diameter on an outer surface of the outer ring; and
a second region on the outer surface of the outer ring, the second region having a second diameter larger than the first diameter,
a circumferential groove at a boundary between the first region and the second region; and
a filler in the groove, and a temperature compensation ring is mounted to the outer ring at the first region so that the temperature compensation ring abuts on an axial end of the second region, wherein the temperature compensation ring has an inner diameter, at least in a region which is disposed over the groove in the radial direction, which corresponds to the outer diameter of the first region.

2. The outer ring according to claim 1, wherein a volume of the filler is at least as great as a volume of the groove.

3. The outer ring according to claim 1, wherein the filler is configured to be at least partially displaced from the groove by the temperature compensation ring, and to extend between the surface of the outer ring and the temperature compensation ring.

4. The outer ring according to claim 1, wherein a coefficient of thermal expansion of the filler is the same as a coefficient of thermal expansion of the temperature compensation ring.

5. The outer ring according to claim 1, wherein a modulus of elasticity of the filler is the same as a modulus of elasticity of the temperature compensation ring.

6. The outer ring according to claim 1, wherein the filler has a temperature resistance of at least 150° C.

7. The outer ring according to claim 1, wherein a volume of the filler is at least as great as a volume of the groove, wherein the filler is configured to be at least partially displaced from the groove by the temperature compensation ring, and to extend between the surface of the outer ring and the temperature compensation ring, wherein a coefficient of thermal expansion of the filler is the same as a coefficient of thermal expansion of the temperature compensation ring, wherein a modulus of elasticity of the filler is the same as a modulus of elasticity of the temperature compensation ring and wherein the filler has a temperature resistance of at least 150° C.

8. A rolling-element bearing including an outer ring according to claim 1.

9. A method for assembling a rolling-element bearing, comprising:
providing an outer ring of a rolling-element bearing having a first region having a diameter and a second region having a greater diameter than the diameter of the first region and a circumferential groove at a boundary of the first region and the second region;
introducing a filler into the groove; and
pushing a temperature compensation ring having an inner diameter which corresponds to the diameter of the first region onto the first region until the temperature compensation ring abuts on an axial end of the second region and is disposed over the groove in the radial direction.

10. The method according to claim 9, wherein the groove has a volume and wherein introducing the filler into the circumferential groove comprises introducing a volume of filler larger than the volume of the groove into the groove.

11. The method according to claim 9, comprising pushing the temperature compensation ring over the groove while the filler is liquid such that the filler in the groove receives a surface shape which correspond to a radially-inward-directed surface shape of the temperature compensation ring.

12. An outer ring for a rolling-element bearing comprising:
a radial inner surface;
a radial outer surface having a first region having a first diameter, a second region having a second diameter larger than the first diameter and an axially facing wall between the first region and the second region, the first region being configured to receive a temperature compensation ring;
a circumferential groove at a boundary of the first region and the axially facing wall, the groove extending radially into the first region and axially into the axially facing wall, such that the temperature compensation ring includes a first portion extending over the groove; and
a filler in the groove, the filler being formed of a material different than a material in which the groove is formed.

13. The outer ring according to claim 12, wherein the filler conforms to the profile of the first portion of the temperature compensation ring.

14. The outer ring according to claim 13, wherein the filler extends along the axially facing wall and adhesively secures the temperature compensation ring to the axially facing wall.

* * * * *